United States Patent
Takahashi et al.

[11] Patent Number: 5,869,111
[45] Date of Patent: Feb. 9, 1999

[54] DISK INJECTION MOLD APPARATUS HAVING MOLD OPENING GUIDE MEANS

[75] Inventors: Mitsuo Takahashi, Matsudo; Katsuyuki Yasuda, Funabashi, both of Japan

[73] Assignee: Seikoh Giken Co., Ltd., Chiba-ken, Japan

[21] Appl. No.: 753,892

[22] Filed: Dec. 2, 1996

Related U.S. Application Data

[63] Continuation-in-part of Ser. No. 489,370, Jun. 12, 1995, abandoned, and Ser. No. 498,235, Jul. 5, 1995, abandoned.

[30] Foreign Application Priority Data

Nov. 30, 1994 [JP] Japan .................................. 6-321758
Dec. 9, 1994 [JP] Japan .................................. 6-331776

[51] Int. Cl.⁶ .................................................. B29C 45/66
[52] U.S. Cl. ................... 425/589; 425/450.1; 425/451.7
[58] Field of Search ................................ 425/589, 450.1, 425/451.7

[56] References Cited

U.S. PATENT DOCUMENTS 3,484,901 12/1969 Anderson ................................ 425/589
4,403,810 9/1983 Bieneck .................................. 425/589

OTHER PUBLICATIONS

The Condensed Chemical Dictionary, p. 193, 1981.

*Primary Examiner*—Tim Heitbrink
*Attorney, Agent, or Firm*—Venable; Robert J. Frank; Julie A. Petruzzelli

[57] ABSTRACT

A horizontal type disk injection mold apparatus having a stationary and a movable mold base, cylindrical cavity molds provided at the center of each base, and a pair of cylindrical guide rings provided concentrically at the outer peripheries of each disk cavity mold, one such guide ring having a female tapered end and the other guide ring having a male tapered end facing and fitting into the female tapered end. One of the guide rings has a plurality of parallel grooves. The other guide ring has a plurality of guide blocks, each such guide block fitting within a parallel groove on the first guide ring. During mold clamping and mold opening, the guide blocks fit into the parallel grooves, ensuring that the disk cavity molds are maintained along the same longitudinal axis during mold opening.

16 Claims, 8 Drawing Sheets

DISK INJECTION MOLD APPARATUS
HAVING MOLD OPENING GUIDE MEANS

This application is a Continuation-In-Part of prior applications Ser. No. 08/489,370 filed Jun. 12, 1995 now abandoned and Ser. No 08/498,235 filed Jul. 5, 1995 now abandoned.

BACKGROUND OF THE INVENTION

1. Field of the Invention

The present invention relates to a horizontal type disk injection molding apparatus having mold opening guide means for preventing axial displacement between stationary and movable disk cavity molds when the mold is opened.

More particularly, the present invention relates to a disk injection molding apparatus having mold opening guide means capable of preventing damage to signal bits transferred to the surface of a molded optical disk due to the axial displacement between the stationary and movable disk cavity molds when the mold is opened following completion of the injection molding process.

2. Description of the Related Art

For injection molding of a magneto-optical disk, a disk injection molding apparatus has been used which comprises a stationary mold base, a movable mold base, cylindrical disk cavity molds provided at the center of each of the bases, and a pair of cylindrical guide rings provided concentrically at the outer peripheries of each of the disk cavity molds as alignment guide means. The circumferential surface joint sections of each tip end of each cylindrical guide ring are male and female tapered fitting surfaces.

Figure 11:
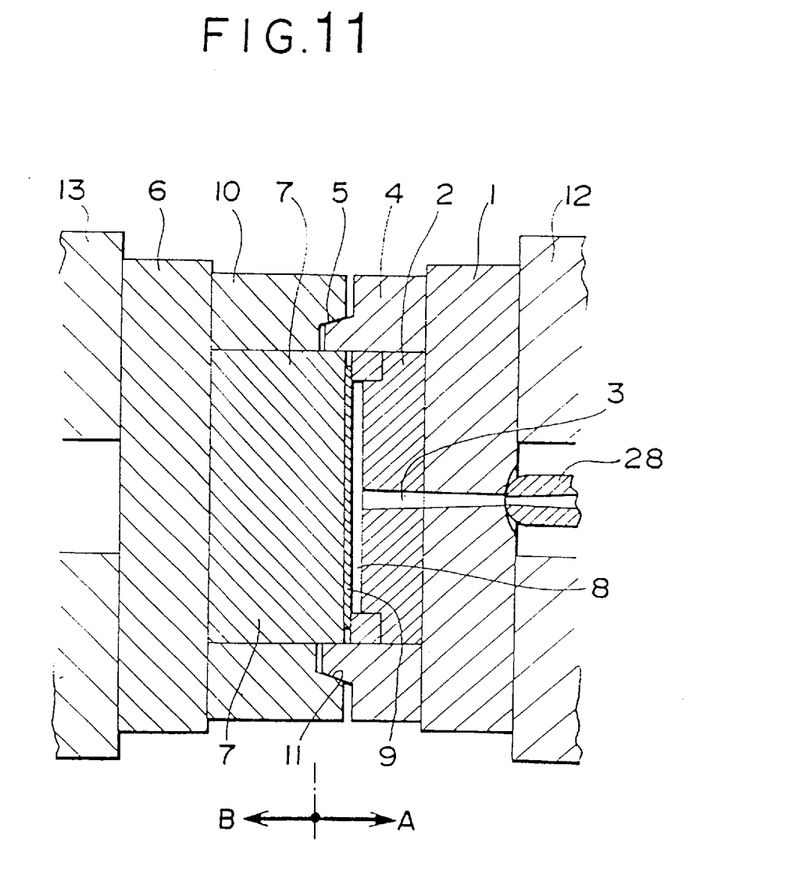
FIG. 11 is a sectional view of a conventional disk injection molding apparatus in a state of mold clamping.
Figure 12:
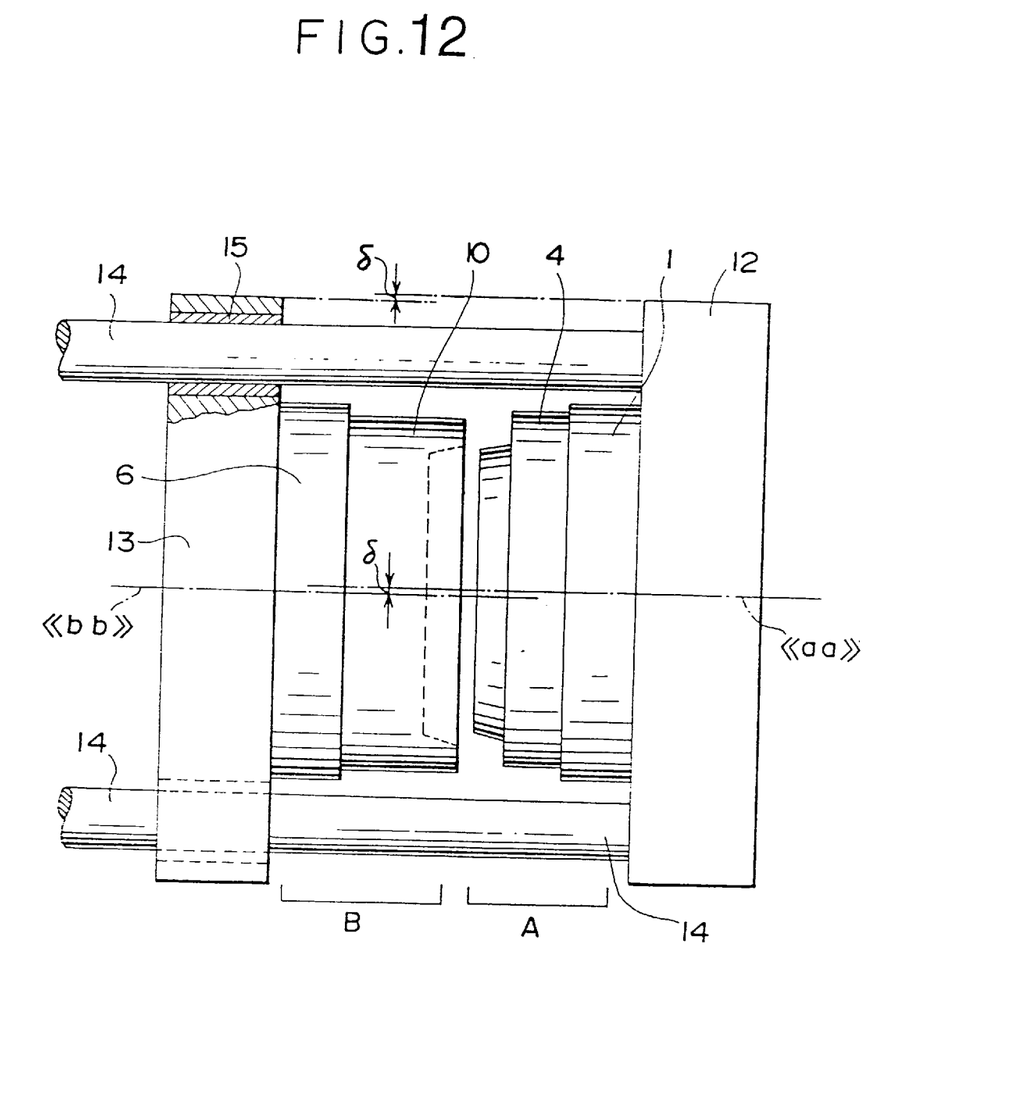
FIG. 12 is a diagram of the conventional disk injection molding apparatus shown in a state in which the mold is being opened.

FIG. 11 is a sectional view of the conventional horizontal type disk injection molding apparatus when the mold is being clamped, and FIG. 12 is a diagram of the conventional apparatus when the mold is being opened.

In these drawings, side A is a stationary mold assembly and side B is a movable mold assembly.

A disk cavity mold 2 is fixed to the stationary mold base 1 of the stationary mold assembly A, and an injection nozzle 3 for injecting a molten resin material is provided at the center thereof. A cylindrical stationary guide ring 4 is integrally fixed to the outer periphery of the stationary mold base 1, and is provided with a male tapered surface 5 at the left tip end surface thereof with an angle of inclination of 3 to 5 degrees. Through a hole in the center of the stationary mold base 1, resin is supplied from a molding nozzle 28 when injection molding is taking place.

A movable disk cavity mold 7 is fixed to a movable mold base 6 of the movable mold assembly B, and a cavity 8, into which a molten resin material is charged, is formed between the stationary disk cavity mold 2 and the movable disk cavity mold 7. A stamper plate 9 is made of pure nickel, and fine signal bits are formed on the surface (right surface in FIG. 11) thereof. The stamper plate 9 is secured to the surface of the movable disk cavity mold 7 with a mounting member (not shown).

A cylindrical movable guide ring 10 is integrally fixed to the outer periphery of the movable mold base 6 or the movable disk cavity mold 7.

A female tapered surface 11 precisely fitting to the male tapered surface 5 of the stationary mold is formed on the right tip end surface of the cylindrical movable guide ring 10.

The molding assemblies A and B as described above are mounted on a stationary platen 12 and a movable platen 13 of the injection mold machine, respectively.

In a state of mold clamping shown in FIG. 11, the molten resin material is charged into the cavity 8 formed between the cavity molds 2 and 7 at a high pressure and molded so as to transfer the fine signal bits of the stamper plate 9 to the resin molded article. Subsequent to the molding, the movable platen 13 is moved backward to open the mold, and the entire resin molded article is removed from the mold.

As shown in FIG. 12, in an optical disk injection molding machine in which the movable platen 13 moves horizontally, the movable platen 13 is held by four horizontal guide rods 14 and driven by a pressure device such as a toggle mechanism and a hydraulic piston (not shown). In this case, an axis <<bb>> of the movable mold assembly B coincides with an axis <<aa>> of the stationary mold assembly A because of the cooperation between the tapered surfaces of the guide rings 4 and 10, during mold clamping. As the mold opening process proceeds a phenomenon occurs whereby the axis of the movable mold assembly B gradually moves downward by the deflection value 6 according to the downward deflection value 6 of the guide rods 14 due to a gap formed between a bearing 15 of the movable platen 13 and the guide rods 14, and because of the weights of the movable platen 13 and the movable mold assembly B. Generally, the deflection value δ of an injection molding machine having a mold clamping ability of 75 tons or more reaches 50 to 70 μm by actual measurement.

In the case of high speed molding of an optical disk, the mold is opened when the inside of the resin molded article is in a partially molten state and the surface thereof is not completely solidified. Thus, the axial displacement between the stationary mold assembly A and the movable mold assembly B should be maintained at zero until the mold opening distance reaches at least 200 μm. If not, the resin molded article may become deformed or double transferring of the fine signal bits transferred to the resin molded article may occur.

For example, if the angle of incline of the guide ring is 5 degrees, the deflection value δ may reach 17.5 μm when the mold opening distance is 200 μm.

Furthermore, during the mold clamping process, the lower portions of each of the tapered guide surfaces are contact loaded for each molding cycle with the total weight of the movable platen 13 and the movable mold assembly B ranging from 300 to 500 kgf as an impact load. Thus, abnormal wearing and a galling of the lower tapered surfaces tends to occur.

In the optical disk injection mold apparatus, avoiding the use of lubricants is required to prevent impurities from getting into cavity 8. To this end, each of the tapered surfaces is subjected to a hardening treatment such as a molybdenum disulfide coating treatment or the like.

In sum, the conventional horizontal type optical disk injection molding apparatus has a number of shortcomings. Deformation of the optical disk, double transferring of the signal bits, and wearing and galling of the fitting surfaces are caused by axial displacement between the molds.

SUMMARY OF THE INVENTION

It is an object of the present invention to provide a disk injection molding apparatus having mold opening guide means capable of preventing the axial displacement between the stationary and movable disk cavity molds.

In order to achieve the object as described above, according to an aspect of the present invention, there is provided a disk injection mold apparatus having mold opening guide means for opening a mold sideways, comprising: a stationary and a movable mold base; cylindrical disk cavity molds provided at the center of each of the bases; and a pair of cylindrical guide rings provided concentrically at the outer peripheries of each of the disk cavity molds to facilitate alignment, one of which has a female tapered tip end and the other of which has a male tapered tip end facing and fitting into the female tapered tip end, wherein a plurality of parallel grooves, each having a surface formed by a hard material, are provided at the outer diameter surface of one of the guide rings and a plurality of guide blocks, each having a surface formed by a hard material and fitting precisely within the parallel groove, are formed at the outer diameter surface of the other guide ring so that no longitudinal axis displacement occurs and the cavity molds are maintained concentrically by fitting the guide blocks to the grooves at the time of mold opening.

According to another aspect of the present invention, there is provided a disk injection mold apparatus, wherein the plurality of parallel grooves consists of one groove provided at each side of the outer diameter surface of one of the guide rings.

According to still another aspect of the present invention, there is provided a disk injection mold apparatus, wherein three or more parallel grooves are provided at equal angles on the outer diameter surface of one of the guide rings.

According to a further aspect of the present invention, there is provided a disk injection mold apparatus, wherein the guide blocks, each having upper and lower surfaces parallel to the parallel grooves provided on the outer diameter surface of one guide ring, are made of a wear resistant material and secured to the end surface of the other guide ring so as to protrude therefrom.

According to a still further aspect of the present invention, there is provided a disk injection mold apparatus, wherein a plate made of a wear resistant material, such as cemented carbide, is secured to either or both upper and lower surfaces of the parallel grooves provided on the outer diameter surface of one guide ring, which upper and lower surfaces fit to the upper and lower surfaces of the guide blocks on the other guide ring.

According to another aspect of the present invention, there is provided a disk injection mold apparatus, wherein the material to be used for the guide grooves and the guide blocks is a cemented carbide having a Rockwell hardness of HRA 83 to 89 and a transverse bending force of 200 kgf/mm$^2$.

It is another object of the present invention to provide a disk injection molding device having a dog-clutch opening guide means which can prevent the displacement between fixed and movable disk cavity dies when opening the dies.

In order to achieve the above object, there is provided a disk injection molding device with a dog-clutch die opening guide means for moving dies horizontally, having a fixed and a movable die base, cylindrical disk cavity dies mounted in the center of the respective bases, a pair of cylindrical guide rings concentrically located, as aligning guide means for the disk cavity dies, on the outer periphery of the cylindrical disk cavity dies and having male and female tapered engaging surfaces in a shaft hole connecting portion at the leading ends of the guide rings, a plurality of grooves extending axially between and piercing the inner periphery and the outer periphery of the tapered-engaging surface on the outside cylindrical surface of one of the guide rings, and a plurality of guide blocks made of hard material protruding from the leading end of the other guide ring and capable of slidably and precisely engaging with the plurality of parallel grooves of the one guide ring, wherein the cylindrical disk cavity dies are held concentrically by a dog-clutch slidable coupling between the guide blocks and the grooves.

More than three grooves may be formed on the guide ring outside cylindrical surface at regular intervals.

The guide blocks may be structured by fixing guide blocks made of wear-resistant material, such as cemented carbide, into grooves on one guide ring corresponding to the plurality of grooves on the other guide ring such that the guide blocks protrude from the leading end surface of the guide ring to which they are attached.

A plate member made of wear-resistant material, such as cemented carbide, may be fixed onto both surfaces of each groove to be engaged with the surfaces of each block or all over the groove.

A material used for the guide grooves and the guide blocks may be a cemented carbide having a Rockwell hardness HRA 83 to 89 and a transverse bending force of 200 kgf/mm$^2$.

DESCRIPTION OF THE PREFERRED EMBODIMENTS

The present invention will be described in more detail with reference to the drawings.

Figure 1:
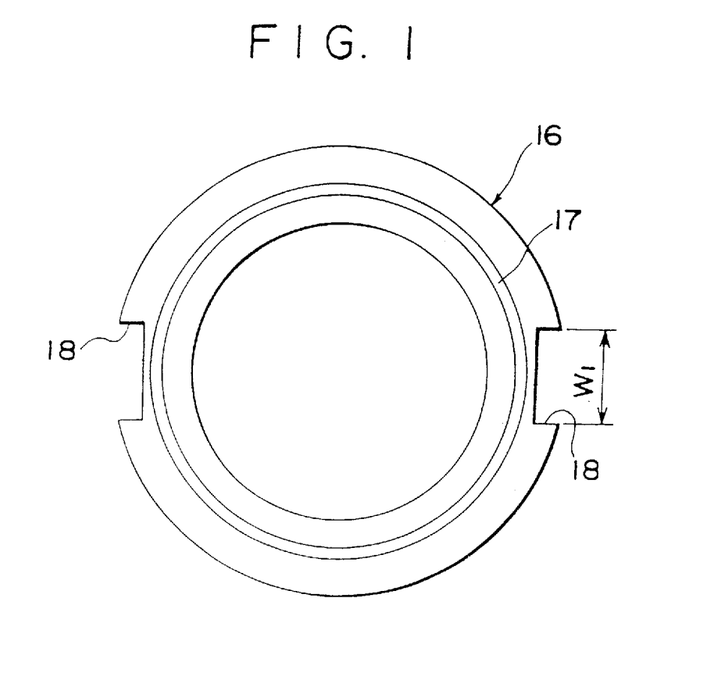
FIG. 1 is a side view showing an embodiment of the stationary guide ring of the mold apparatus according to the present invention.
Figure 2:
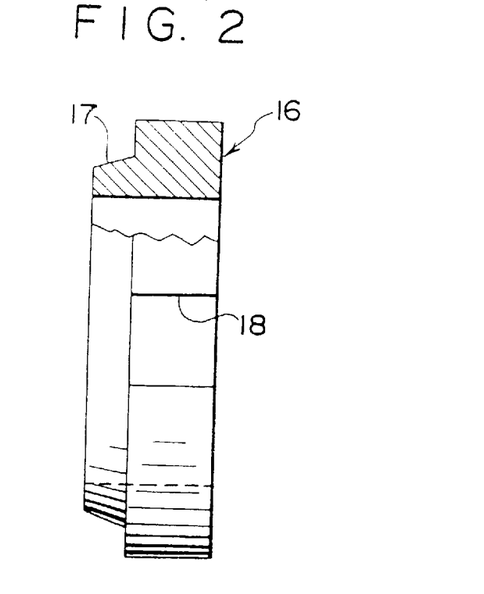
FIG. 2 is a front view partially in cross section of the embodiment of the stationary guide ring of FIG. 1.

FIG. 1 is a side view showing an embodiment of a stationary guide ring of a molding apparatus according to the present invention, and FIG. 2 is a front view, partially in cross section, of the above stationary guide ring.

As shown in FIG. 2, a male tapered surface 17 with an angle of incline of 5 degrees is formed on the left end surface of the stationary guide ring 16. In the drawing, the angle of inclination is exaggerated for the purpose of easy understanding. A pair of precisely worked right and left parallel grooves 18, each having a width $W_1$, are provided in the outer diameter surface of the stationary guide ring 16, as shown in FIG. 1.

Figure 3:
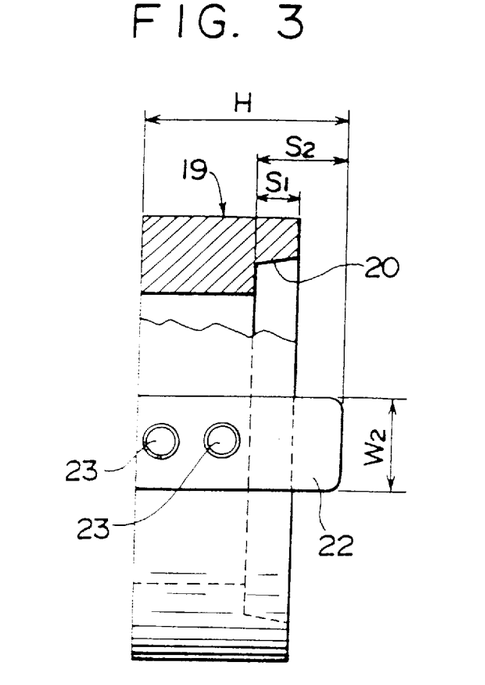
FIG. 3 is a front view partially in cross section of an embodiment of the movable guide ring of the mold apparatus according to the present invention.
Figure 4:
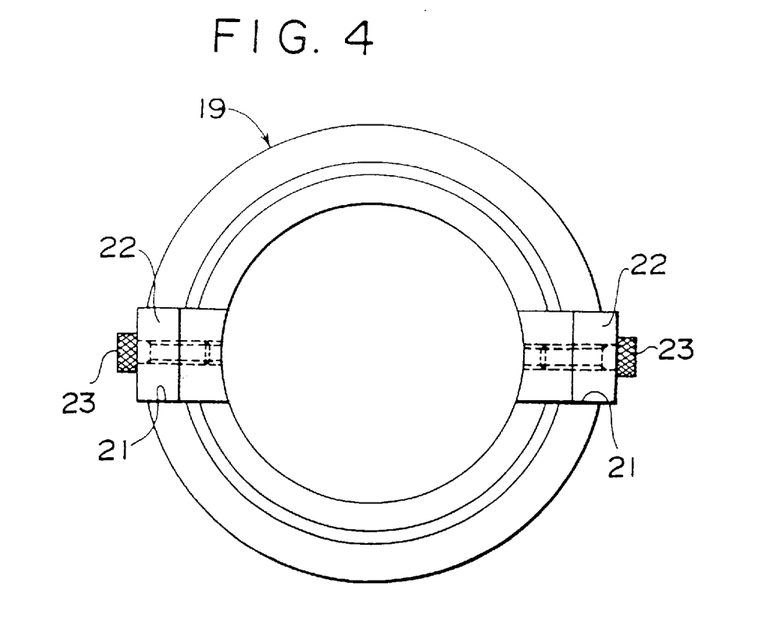
FIG. 4 is a side view of the embodiment of the movable guide ring of FIG. 3.

FIG. 3 is a front view, partially in cross section, of an embodiment of a movable guide ring of the molding apparatus according to the present invention, and FIG. 4 is a side view of the above embodiment of the movable guide ring.

As shown in FIG. 3, a female tapered surface 20 with the same angle of inclination as that of the male tapered surface 17 of the stationary guide ring 16 is formed on the right end circumferential section of a movable guide ring 19.

A pair of precisely worked right and left parallel grooves 21, each having a width $W_1$, are provided, at positions corresponding to the parallel grooves 18 of the stationary guide ring 16, in the outer diameter surface of the movable guide ring 19. Guide blocks 22 made of superalloy materials, each having a width $W_2$, and a height H are secured to the parallel grooves 21 with check bolts 23, respectively.

The stationary guide ring 16 and the movable guide ring 19 are secured with check bolts (not shown)to the stationary mold base and the movable mold base similar to those shown in FIG. 11 or FIG. 12, respectively.

The upper and lower surfaces of the precisely worked parallel grooves 18 of the stationary guide ring 16 and the upper and lower surfaces of the guide blocks 22 of the movable guide ring 19 are pressure sliding friction surfaces because a tapered surface fitting is not used therefor.

Furthermore, lubricant can not be used in the optical disk injection mold as described above. Therefore, selection of materials for each section of the apparatus is an important factor to ensure durable stability of the disk injection mold.

In this embodiment, a cemented carbide having a Rockwell hardness of HRA 83 to 89 and a transverse bending force of 200 $kgf/mm^2$ is used as a material for the guide blocks 22.

Martensitic stainless steels, such as SUS420, SUS440 and the like, subjected to a heat treatment so as to be hardened are used as materials for the stationary guide ring 16 and movable guide ring 19. The stationary guide ring 16 is subjected to wear resistant surface treatment such as molybdenum disulfide coating.

Furthermore, if a rectangular plate made of wear resistant material such as cemented carbide is secured with the check bolt to either or both upper and lower surfaces of the precisely worked parallel grooves 18 of the stationary guide ring 16 which come into contact with the upper and lower surfaces of the guide block 22 made of a cemented carbide material, the wear resistance of the stationary guide ring 16 can be further improved.

The width $W_1$ of the precisely worked parallel groove 18 of the stationary guide ring 16 and the width $W_2$ of the guide block 22 of the movable guide ring 19 are precisely produced so that the fitting gap formed therebetween is within 3 $\mu$m at normal temperatures. A fitting length $S_2$ between the guide block 22 and the parallel groove 18 of the stationary guide ring 16 is set at least over 5 mm longer than the length $S_1$, of the tapered section so that the guide block 22 precedes the tapered guide surface by 5 mm to be fitted into the precisely worked parallel groove 18 of the stationary guide ring 16.

Figure 5A:
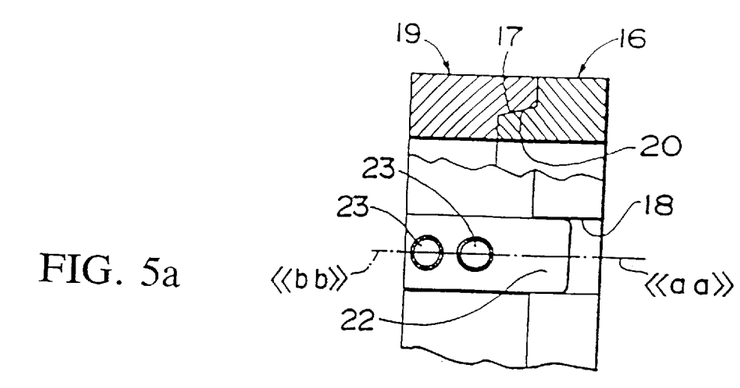
FIGS. 5a, 5b, and 5c are schematic diagrams for explaining the operation of the mold apparatus according to the present invention.
Figure 5B:
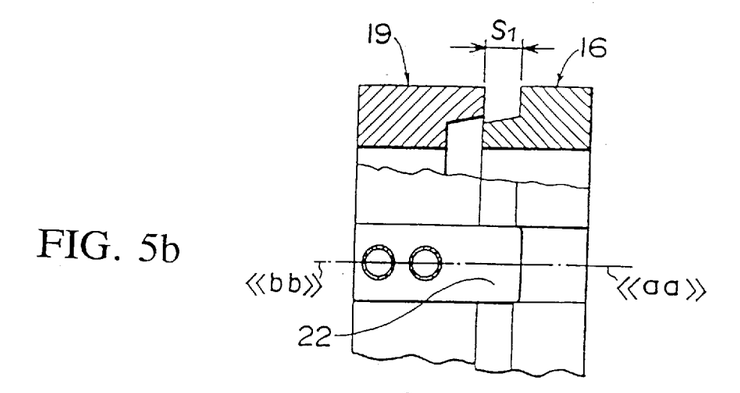
Figure 5C:
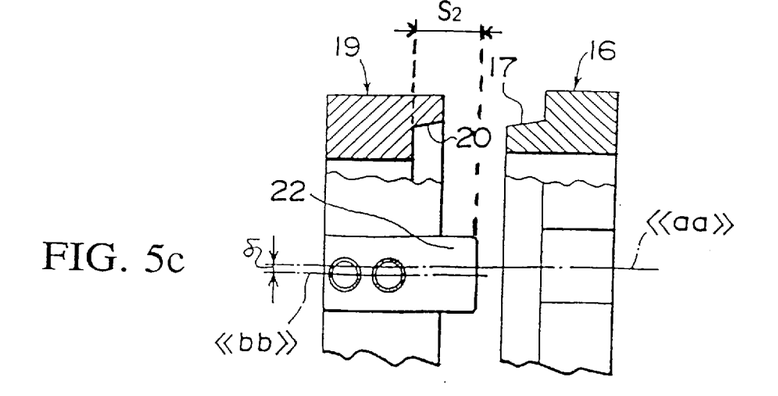

FIGS. 5a, 5b, and 5c are schematic diagrams which show the operation of the guide mechanism of the disk injection molding apparatus having a mold opening means according to the present invention.

FIG. 5a shows a state wherein the stationary guide ring 16 is joined to the movable guide ring 19 in a mold clamping position. In this state, the tapered guide surfaces 17 and, 20 and the guide block 22 are simultaneously fitted to and in contact with the parallel groove 18 of the stationary guide ring 16. Therefore, a center line <<aa>> of the stationary mold assembly A coincides with a center line <<bb>> of the movable mold assembly B.

FIG. 5b shows a state wherein the mold is opened by a very short distance $S_1$ with the tapered guide surfaces 17 and 20 held by the guide block 22 so that the center line <<aa>> of the stationary mold assembly A coincides with the center line ebb>> of the movable mold assembly B.

FIG. 5c shows a state wherein the mold opening distance exceeds $S_2$, whereby the guide block 22 of the movable mold assembly B is separated from the parallel groove 18 of the stationary guide ring 16. In this case, the center line <<bb>> of the movable mold assembly B rapidly moves downward by the above-mentioned deflection value δ so as to be displaced with respect to the center line <<aa>> of the stationary mold assembly A.

As described above, the center line <<aa>> of the stationary mold assembly A coincides with the center line <<bb>> of the movable mold assembly B so that the axial displacement therebetween can be maintained at zero until the mold opening distance reaches at least 200 $\mu$m.

It will be appreciated that various modifications may be made to the above embodiment without departing from the scope of the present invention.

For example, by providing three or more pairs of guide blocks and precisely worked parallel grooves radially with respect to the guide ring, the longitudinal and transverse axial displacement between the stationary and movable mold assemblies A and B can be simultaneously controlled.

In the disk injection molding apparatus having mold opening guide means according to the present invention, the guide mechanism, which is capable of moving horizontally the stationary and movable molds, is provided to prevent the longitudinal axial displacement between the stationary and movable molds caused when the mold is opened following injection molding. Therefore, displacement of the fine signal bits transferred to the optical disk molded article and quality deterioration of the molded substance due to double transferring and deformation can be prevented.

Since cemented carbide is used for either or both the guide blocks 22 and parallel groove surfaces 18, the guide blocks 22 and parallel grooves 18 have durable stability and point of wear resistance even in an environment where lubricants can not be used.

The guide rings are equipped with guide mechanisms composed of the guide blocks 22 and parallel grooves 18. Thus, an additional volume increase of the mold is not required, whereby a compact and lightweight mold can be designed.

Furthermore, there is no need to change the structure of the injection molding machine. Therefore, the disk injection molding apparatus having mold opening guide means according to the present invention can be provided by improving only the guide ring sections of the conventional apparatus.

Another embodiment of this present invention will now be described in more detail with reference to FIGS. 6 to 10.

Figure 6:
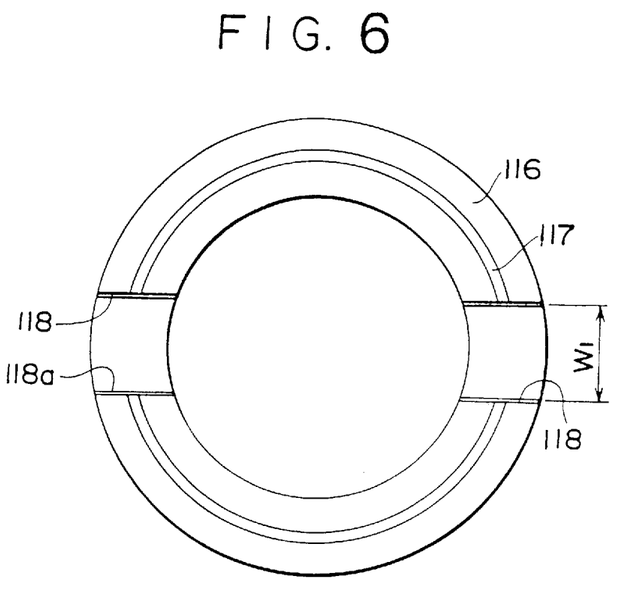
FIG. 6 is a side view showing a fixed guide ring in a disk injection molding device having a dog-clutch opening guide means according to another embodiment of the present invention.
Figure 7:
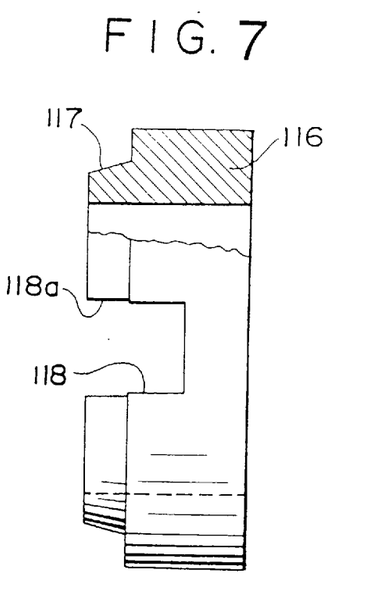
FIG. 7 is a front view of the fixed guide ring of FIG. 6.

FIG. 6 is a side view of a fixed guide ring used in a disk injection molding device having a dog-clutch opening guide means according to another embodiment of the present invention, and FIG. 7 is a partially cutaway front view of the fixed guide ring of FIG. 6.

Referring to FIG. 7, a male tapered surface 117 with a 5-degree slope is formed at the left end of a fixed guide ring 116. The slope is exaggerated for easy illustration and understanding. As shown in FIG. 6, a pair of precisely worked grooves 118, having a width $W_1$ elongate on the left and right sides of the leading end surface of the fixed guide ring 116. An entrance 118a of each groove 118 is a little wider than the above-mentioned width $W_1$.

Figure 8:
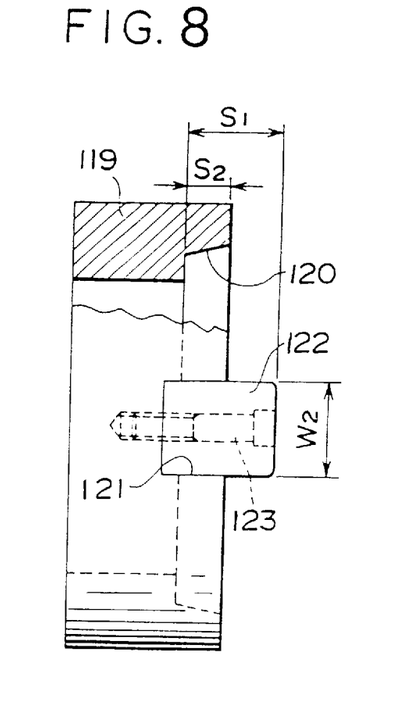
FIG. 8 is a front view showing a movable guide ring of the disk injection molding device having a dog-clutch opening guide means.
Figure 9:
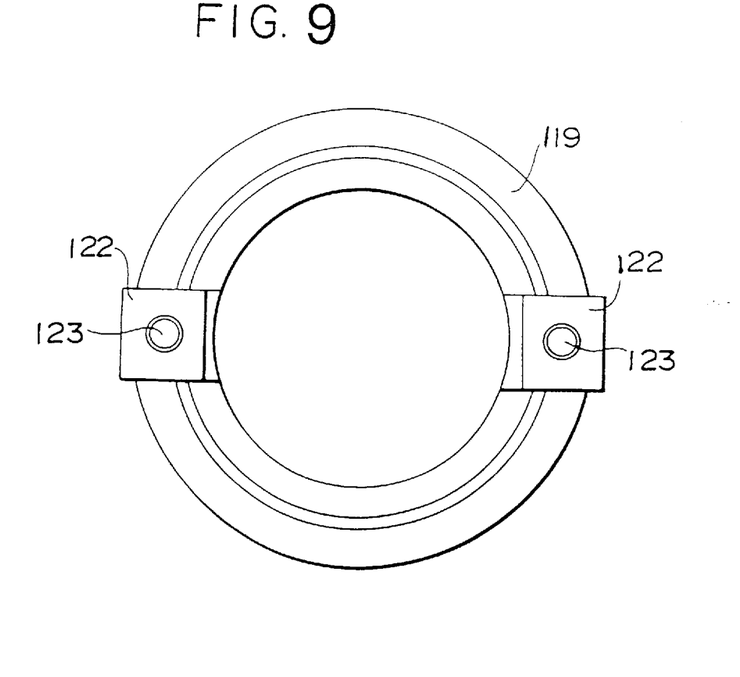
FIG. 9 is a side view of the movable guide ring of FIG. 8.

FIG. 8 is a partially cutaway front view of a movable guide ring of the molding device having a dog-clutch opening guide means according to the embodiment of the present invention, and FIG. 9 is a side view of the movable guide ring of FIG. 8.

As shown in FIG. 8, a cylindrical movable guide ring 119 has a female tapered surface 120, which has the same taper angle as the male tapered surface 117 of the fixed guide ring 116, on the periphery at the right end thereof. A pair of precisely worked parallel grooves 121 having the width $W_1$ are formed on the right and left sides of the outside cylindrical surface of the cylindrical movable guide ring 119 corresponding to the grooves 118 of the fixed guide ring 116. Into the parallel grooves 121, guide blocks 122, made of cemented carbide and having a width $W_2$ and a projection length ($S_1$–$S_2$) from the surface of the movable guide ring 119, are respectively fixed by check bolts.

The fixed and movable guide rings 116 and 119 are respectively fixed to the fixed and movable die bases shown in FIGS. 11 and 12 by check bolts (not shown).

Since the upper and lower surfaces of each parallel groove 118 of the fixed guide ring 116 and the upper and lower surfaces of each guide block 122 of the movable guide ring 119 are not engaged with each other through the fitting of tapered surfaces, all the contact surfaces therebetween are pressurized slide frictional surfaces.

As mentioned above, since no lubricant can be used in the optical disk injection molding device, the selection of material for each component is important to ensure durability and stability. In this embodiment, the guide blocks 122 are made of a cemented carbide having a Rockwell hardness of HRA 83 to 89 and a transverse bending force of 200 kgf/mm$^2$. The material of the fixed and movable guide rings 116 and 119 is a martensitic stainless steel, such as SUS420 and SUS440, which is treated with heat and hardened to achieve HR C52 to 60. Wear-resistant surface treatment, for example, a molybdenum disulfide coating, is applied to the fixed guide ring 116. The wear resistance can be further enhanced by fixing rectangular plates made of wear-resistant material, such as cemented carbide, by check bolts onto the upper and lower surfaces of the precisely worked parallel grooves 118 of the fixed guide ring 116 which are to be in contact with the upper and lower surfaces of the cemented carbide guide blocks 122, or all over the parallel grooves 118.

Die production is required to be done so precisely that the engagement clearance between the width $W_1$ of the precisely worked parallel grooves 118 of the fixed guide ring 116 and the width $W_2$ of the guide blocks 122 of the cylindrical movable guide ring 119 is less than 3 μm at room temperature.

An engagement length $S_1$ of each guide block 122 and each parallel groove 118 of the fixed guide ring 116 is set at least 5 mm longer than a length $S_2$ of the tapered surface 120 of the cylindrical movable guide ring 119, by which the guide block 122 engages the precisely worked parallel groove 118 5 mm ahead of the tapered surfaces 117 and 120.

Figure 10A:
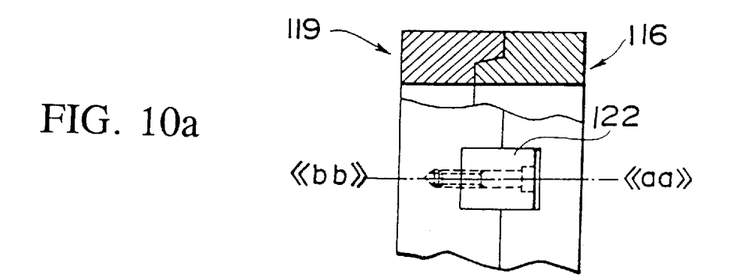
FIGS. 10a, 10b, and 10c are schematic views showing the operation of the disk injection molding device having a dog-clutch opening guide means.
Figure 10B:
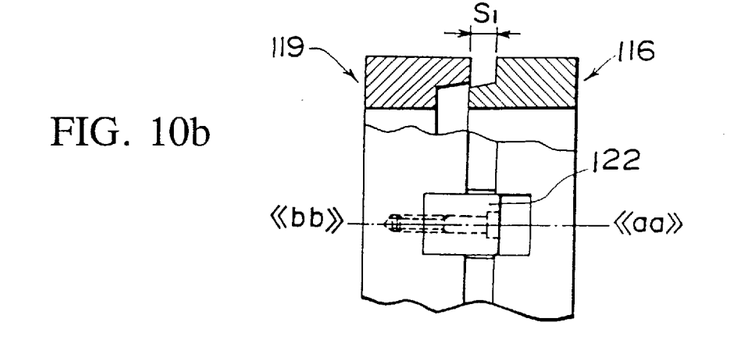
Figure 10C:
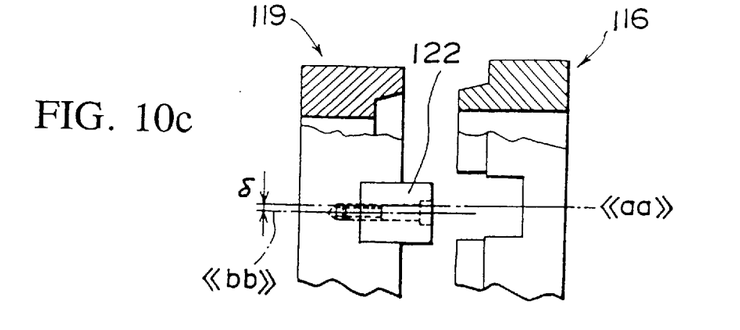

FIGS. 10a, 10b and 10c are motion views of the disk injection molding device having a dog-clutch opening guide means according to the present invention.

FIG. 10a shows a coupling state between the fixed guide ring 116 and the cylindrical movable guide ring 119 in a die clamping position. In this state, the tapered surfaces 117 and 120, the guide block 122, and the parallel groove 118 of the fixed guide ring 116 are simultaneously engaged with each other. Therefore, a center line <<aa>> of the fixed die assembly A and a center line <<bb>> of the movable die assembly B coincide with each other.

FIG. 10b shows a state in which the tapered guide surfaces 117 and 120 are held by the guide blocks 122, the center line <<aa>> of the fixed die assembly A and the center line <<bb>> of the movable die assembly B coincide with each other, and the opening between the dies is extremely short, $S_1$.

FIG. 10c shows a state at a moment when the opening between the dies exceeds $S_2$ and the guide block 122 of the movable die assembly B is detached from the parallel groove 118 of the fixed guide ring 116. In this case, the center line <<bb>> of the movable die assembly B rapidly falls and shifts from the center line <<aa>> of the fixed die assembly A by the above-mentioned deflection amount δ.

As described above, the center line <<aa>> of the fixed die assembly A and the center line <<bb>> of the movable die assembly B can coincide with each other within a predetermined range when the dies are opened, thereby keeping the displacement of the centers of the shafts of the fixed and movable disk cavity dies to zero.

While the present invention has been described in detail in its preferred embodiment, many modifications and variations of the present invention are possible within the scope of the invention.

Although a pair of guide blocks 122 are respectively located on the right and left sides of the cylindrical movable guide ring 119 in the embodiment, more than three pairs of guide blocks 122 and parallel grooves 118 may be located radially relative to the center of the fixed and movable guide rings 116 and 119, which can limit the horizontal and vertical shaft center displacement between the fixed die assembly A and the movable die assembly B.

A disk injection molding device having a die opening guide means according to the present invention is provided with a guide mechanism which is capable of moving a fixed die and a movable die in parallel to prevent the vertical shaft center displacement between the fixed die and the movable die caused when dies are opened after injection molding. Therefore, it is also possible to prevent the degradation resulting from the displacement and double transfer of fine signal bits transferred on to a molded optical disk.

Furthermore, since both or one of the guide blocks and the parallel grooves are made of cemented carbide, sufficient durability and stability for wear resistance can be obtained even in a condition where a lubricant cannot be used.

Since the guide mechanism achieved by the guide blocks and the parallel grooves is incorporated into each guide ring, additional increase in die capacity is not needed. Thus, dies can be designed to be compact and lightweight.

Still furthermore, a disk injection molding device having the die opening guide means of this invention can be provided by improving only the guide rings of a conventional molding device.

What is claimed is:

1. A horizontal disk injection molding apparatus for molding a disk having information bits on a surface thereof, said apparatus having a dog-clutch die opening guide means for maintaining first and second cylindrical disk cavity dies axially aligned when the dies are separated, comprising:

a fixed base member;

a movable base member;

a first cylindrical guide ring concentrically located on an outer periphery of the first cylindrical disk cavity die, said first cylindrical guide ring having an outer circumferential surface, a first tapered portion with inner and outer peripheries projecting from said first cylindrical guide ring and a plurality of first grooves extending axially between and piercing through the inner and outer peripheries of said first tapered portion, the entrance of each said first groove being wider than the remainder of said first groove;

a second cylindrical guide ring concentrically located on an outer periphery of the second cylindrical disk cavity die, said second cylindrical guide ring having an outer circumferential surface and a second tapered portion projecting from said second cylindrical guide ring for fitting with said first tapered portion of said first cylindrical guide ring while the first and second cylindrical disk cavity dies are being clamped together; and a plurality of guide blocks, each of said guide blocks protruding from the outer circumferential surface of said second cylindrical guide ring and slidably fitting within a corresponding first groove on said first cylindrical guide ring, said guide blocks and said first grooves when fit together forming a dog-clutch slidable coupling to hold the first and second cylindrical disk cavity dies axially aligned while the dies are opening.

2. A horizontal disk injection molding apparatus according to claim 1, wherein one of said first and second tapered portions is male and the other is female.

3. A horizontal disk injection molding apparatus according to claim 1, wherein said tapered male portion and said tapered female portion each has angles of incline of substantially 5 degrees.

4. A horizontal disk injection molding apparatus according to claim 1, wherein said plurality of first grooves consists of a groove on each side of said first tapered portion.

5. A horizontal disk injection molding apparatus according to claim 1, wherein said plurality of first grooves consists of three or more grooves provided at equal intervals on said first tapered portion.

6. A horizontal disk injection molding apparatus according to claim 1, wherein said second cylindrical guide ring has a plurality of second grooves on the outer circumferential surface corresponding to said first grooves.

7. A horizontal disk injection molding apparatus according to claim 6, wherein said guide blocks are secured to said second cylindrical guide ring by fixing said guide blocks into said second grooves.

8. A horizontal disk injection molding apparatus according to claim 1, wherein each of said first grooves has an upper and lower surface and each of said guide blocks has an upper and lower surface parallel to the upper and lower surfaces of one of said first grooves and fitting within said first groove.

9. A horizontal disk injection molding apparatus according to claim 8, wherein a plate comprised of a wear resistant material is secured to said upper and lower surfaces of said first grooves.

10. A horizontal disk injection molding apparatus according to claim 9, wherein said plate is comprised of cemented carbide.

11. A horizontal disk injection molding apparatus according to claim 1, wherein a plate comprised of a wear resistant material is secured to an entire surface of said first groove.

12. A horizontal disk injection molding apparatus according to claim 11, wherein said plate is comprised of cemented carbide.

13. A horizontal disk injection molding apparatus according to claim 1, wherein at least one of said first grooves and said guide blocks is comprised of a cemented carbide having a Rockwell hardness of HRA 83–89 and a transverse bending force of 200 kgf/mm$^2$.

14. A horizontal disk injection molding apparatus according to claim 1, wherein said guide blocks are secured to the outer circumferential surface of said second cylindrical guide ring so as to protrude by at least 5 mm beyond said second cylindrical guide ring.

15. A horizontal disk injection molding apparatus according to claim 1, wherein said guide blocks fit within said first grooves with a gap between said guide blocks and said first grooves of less than 3 $\mu$m at normal temperatures.

16. A horizontal injection molding apparatus for molding a disk having information bits on a surface thereof, said apparatus having a dog-clutch die opening guide means for maintaining first and second cylindrical disk cavity dies axially aligned when the dies are separated, comprising:

a fixed base member in the center of which the first cylindrical disk cavity die is mounted;

a movable base member in the center of which the second cylindrical disk cavity die is mounted;

a first cylindrical guide ring concentrically located on an outer periphery of the first cylindrical disk cavity die, said first cylindrical guide ring having a first tapered portion with inner and outer peripheries projecting from said first cylindrical guide ring and a plurality of first grooves extending axially between and piercing through the inner and outer peripheries of said first tapered portion, the entrance of each said first groove being wider than the remainder of said first groove;

a second cylindrical guide ring concentrically located on an outer periphery of the second cylindrical disk cavity die, said second cylindrical guide ring having an outer circumferential surface and a second tapered portion projecting from said second cylindrical guide ring for fitting with said first tapered portion of said first cylindrical guide ring while the first and second cylindrical disk cavity dies are being clamped together; and a plurality of guide blocks, each of said guide blocks protruding from the outer circumferential surface of said second cylindrical guide ring and slidably fitting within a corresponding first groove on said first cylindrical guide ring, said guide blocks and said first grooves when fit together forming a dog-clutch slidable coupling to hold the first and second cylindrical disk cavity dies axially aligned while the dies are opening.

* * * * *